US011157385B2

(12) United States Patent
Cheng et al.

(10) Patent No.: US 11,157,385 B2
(45) Date of Patent: *Oct. 26, 2021

(54) TIME-WEIGHTED RISKY CODE PREDICTION

(71) Applicant: MICROSOFT TECHNOLOGY LICENSING, LLC., Redmond, WA (US)

(72) Inventors: Xi Cheng, Kirkland, WA (US); Neelakantan Sundaresan, Bellevue, WA (US); Mingwei Tang, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/674,434

(22) Filed: Nov. 5, 2019

(65) Prior Publication Data
US 2020/0073784 A1     Mar. 5, 2020

Related U.S. Application Data

(63) Continuation of application No. 16/005,663, filed on Jun. 11, 2018, now Pat. No. 10,489,270.

(60) Provisional application No. 62/619,810, filed on Jan. 21, 2018.

(51) Int. Cl.
*G06F 11/36* (2006.01)
*G06F 8/75* (2018.01)
*G06F 8/71* (2018.01)
*G06N 20/00* (2019.01)

(52) U.S. Cl.
CPC ............ *G06F 11/3608* (2013.01); *G06F 8/71* (2013.01); *G06F 8/75* (2013.01); *G06F 11/3616* (2013.01); *G06N 20/00* (2019.01)

(58) Field of Classification Search
USPC ........................................................ 717/130
See application file for complete search history.

(56) References Cited

U.S. PATENT DOCUMENTS

| 10,489,270 | B2* | 11/2019 | Cheng | G06N 20/00 |
| 2015/0178634 | A1* | 6/2015 | Chen | G06F 11/008 706/12 |

OTHER PUBLICATIONS

Puranik et al., A Novel Machine Learning Approach for Bug Prediction, 2016, Elsevier B. V.pp. 924-930. (Year: 2016).*

* cited by examiner

*Primary Examiner* — John Q Chavis

(57) ABSTRACT

A classification machine learning model is trained to predict the likelihood that a software program is likely to have a software bug in the future. The model is based on features from different source code files having changes made to fix a software bug and source code files having changes that were not made for a bug fix. The features include a time-weighted bug density, a time-weighted addition factor, and a time-weighted deletion factor for a source code file and its dependent code, a page rank, and complexity features representing a number of different types of code elements in the source code file.

20 Claims, 9 Drawing Sheets

FEATURE VECTOR FOR FILE A FOR TRAINING THE MACHINE LEARNING MODEL 900

- 904 — TIME-WEIGHTED BUG DENSITY,
- 906 — TIME-WEIGHTED ADDITION FACTOR,
- 908 — TIME-WEIGHTED DELETION FACTOR,
- 910 — COMPLEXITY FACTORS,
- 912 — TIME-WEIGHTED BUG DENSITY FOR DEPENDENT FILES,
- 914 — TIME-WEIGHTED ADDITION FACTOR FOR DEPENDENT FILES,
- 916 — TIME-WEIGHTED DELETION FACTOR FOR DEPENDENT FILES,
- 920 — PAGE RANK,
- 922 — LABEL.

*FIG. 9A*

FEATURE VECTOR FOR TARGET FILE – INPUT TO THE MACHINE LEARNING MODEL TO GENERATE RISK SCORE 902

- 924 — TIME-WEIGHTED BUG DENSITY,
- 926 — TIME-WEIGHTED ADDITION FACTOR,
- 928 — TIME-WEIGHTED DELETION FACTOR,
- 930 — COMPLEXITY FACTORS,
- 932 — TIME-WEIGHTED BUG DENSITY FOR DEPENDENT FILES,
- 934 — TIME-WEIGHTED ADDITION FACTOR FOR DEPENDENT FILES,
- 936 — TIME-WEIGHTED DELETION FACTOR FOR DEPENDENT FILES,
- 938 — PAGE RANK.

*FIG. 9B*

TIME-WEIGHTED RISKY CODE PREDICTION

CROSS-REFERENCE TO RELATED APPLICATION

This is a continuation of application Ser. No. 16/005,663 filed on Jun. 11, 2018, entitled "TIME-WEIGHTED RISKY CODE PREDICTION", the entirety of which is incorporated by reference.

BACKGROUND

As software becomes more complex, it is inevitable that the number of software bugs will increase rapidly. A software bug is an error or defect in a source code program that causes the program to behave in an unexpected way or produce an erroneous or unexpected result. Software bugs hinder the development of a software program since the detection of a software bug may consume a significant amount of time to detect, especially when the location of the software bug is unknown. No matter has rigorous the program is tested, a software bug may go undetected and create disastrous results if left unresolved.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A classification-type machine learning model is generated to compute a risk score for each source code file in a particular code base. The risk score represents a probability that a particular source code from the code base is likely to contain a software bug in the future. The prediction is based on features contained within a source code file that have a strong correlation to produce a software bug. The machine learning model is trained on features that include a time-weighted bug density, a time-weighted addition factor, a time-weighted deletion factor for select source code files in a code base and for the dependent code of the select source code files. The features also include complexity factors that are based on the types of programming elements contained in a source code file. A page rank is computed for each file based on its dependency relationship with other files in the code base in order to set a statistical significance to the features of one file over the features of other files in the code base.

The classification-type machine learning model is then used on a target source code file from the code base to generate a risk score that represents the likelihood that the target source code file will contain a software bug in the future. In addition to the risk score, a conclusion is also provided that explains the rationale for the risk score.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 9A is an exemplary feature vector for training the machine learning model and FIG. 9B is an exemplary feature vector used as input to the machine learning model to determine a risk score.

DETAILED DESCRIPTION

Overview

The subject matter disclosed generates a classification-type machine learning model to predict the likelihood that a file will have a software bug. The machine learning model is trained on those features having the most effect on producing a software bug. The features are based on historical data that shows the changes made to a collection of files including its dependent code and are also based on the programming language elements used in the source code file. The historical data includes changes made to a collection of files, over time, to correct bugs and changes made to another collection of files that did not have bug fixes.

The features based on the historical data include a time-weighted bug density, a time-weighted addition factor, a time-weighted deletion factor for select source code files in a code base and for the dependent code of the select source code files. The bug density represents how prone the source code file is to software bugs based on the changes made, over time, to a file to correct bugs. The bug density relies on the assumption that software bugs tend to cluster in the same location and that past locations of a software bug are good predictors where other bugs may be found. An addition factor and the deletion factor represent the magnitude of the changes made to fix a software bug by the number of lines of code added and/or deleted, over time, to correct a software bug. The bug density, addition factor and deletion factor are time-weighted to provide more statistical significance to the changes made recently.

The features also include complexity factors that are based on the types of programming elements contained in a source code file. The more complex programming elements that are used in a source code file the more likely the source code file is to have undetected software bugs. A page rank is also used as a feature to train the model. The page rank is computed for each file based on its dependency relationship with other files in the code base. The page rank sets a statistical significance to the features of one file over the features of other files in the code base when a file is used more by other files.

Attention now turns to a further discussion of the system, devices, components, and methods utilized in the machine learning comparison tool.

System

Figure 1:
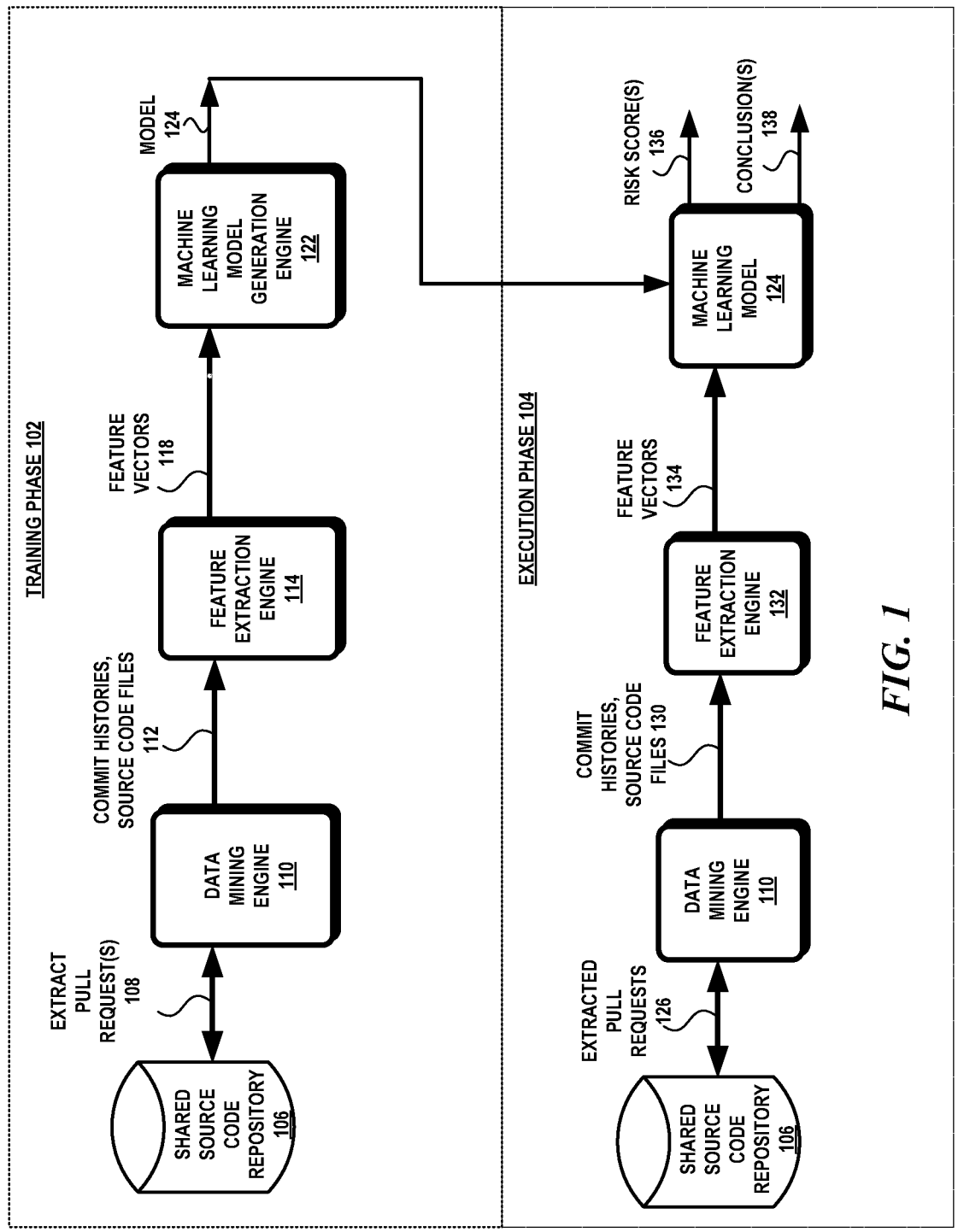
FIG. 1 illustrates an exemplary system training and utilizing a machine learning model to generate risk scores.

FIG. 1 illustrates a block diagram of an exemplary system 100 in which various aspects of the invention may be practiced. As shown in FIG. 1, system 100 includes a training phase 102 which trains a machine learning model and an execution phase 104 that utilizes the machine learning model to predict the likelihood that one or more files are likely to contain a software bug and the rationale for the model's conclusion.

The training phase 102 builds a machine learning model 124 for a particular code base. A code base is a collection of source code files used to generate an application, component, module or system. A code base may be associated with a particular software project and/or development team. The training phase 102 may utilize a shared source code repository 106, a data mining engine 110, a feature extraction engine 114, and a model generation engine 122.

The shared source code repository 106 is a file archive and web hosting facility that stores large amounts of artifacts, such as source code files and the code base. Programmers (i.e., developers, users, end users, etc.) often utilize a shared source code repository 106 to store source code and other programming artifacts that can be shared among different programmers. A programming artifact is a file that is produced from a programming activity, such as source code, program configuration data, documentation, and the like. The shared source code repository 106 may be configured as a source control system or version control system that stores each version of an artifact, such as a source code file, and tracks the changes or differences between the different versions. Repositories managed by source control systems are distributed so that each user of the repository has a working copy of the repository. The source control system coordinates the distribution of the changes made to the contents of the repository to the different users.

In one aspect, the shared source code repository 106 is implemented as a cloud or web service that is accessible to various programmers through online transactions over a network. An online transaction or transaction is an individual, indivisible operation performed between two networked machines. A programmer may check out an artifact, such as a source code file, and edit a copy of the file in its local machine. When the user is finished with editing the source code file, the user performs a commit which checks in the modified version of the source code file back into the shared source code repository. A pull request informs others that changes have been made to one or more file which were pushed or committed back into the repository.

A shared source code repository 106 may be privately accessible or publicly accessible. There are various types of shared source code repositories, such as without limitation, GitHub, BitBucket, CloudForge, ProjectLocker, GitHub, SourceForge, LaunchPad, etc., and any one or combination thereof may be used herein.

The data mining engine 110 extracts data from the shared source code repository 106 to train the model. The data mining engine 110 searches for pull requests of a particular code base in order to obtain the commit histories 112 of the files identified within each pull request that have had changes made. The changes may have been made to fix a software bug and for other reasons. The commit histories for each of the files in the pull request are used by the feature extraction engine 114 to extract features that will train the model. The feature extraction engine formats the features into feature vectors 118 with a label that indicates whether a feature vector corresponds to a software bug or not.

The feature vectors 118 are then used to train and test a model to predict the likelihood or probability that a particular file will have a software bug and a reasoning for that prediction. The feature vectors 118 may be partitioned into two subsets such that one subset is used to train a model and the second subset is used to test the model. The model is trained and tested until the model can perform within a prescribed tolerance.

In one aspect, the model is a classification model. Classification predicts a discrete label for each sample. There are various classification models, such as without limitation, discrete tree classifiers, random tree classifiers, neural networks, support vector machine, naïve Bayes classifiers and the like. Preferably, a gradient boost classification model is generated. Gradient boost classification is able to predict a probability with each label which enables the risk scores to be ranked. In addition, it is more adaptable to changes and scalable.

The execution phase 104 uses the machine learning model 124 on source code changes that have been made to one or more target files in the code base that was used to train the machine learning model. The data mining engine 110 extracts changes made to the target files from a shared source code repository 106 by mining pull requests 126 associated with the files. The data mining engine 110 extracts the commit histories and source code files for each target file included in a pull request and the feature extraction engine 132 generates feature vectors 134 having features that represent different attributes of the target files in the pull request. The model 124 then uses the feature vectors 134 to assign a risk score to a target file and a reason for the risk score.

The various embodiments of the system 100 may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
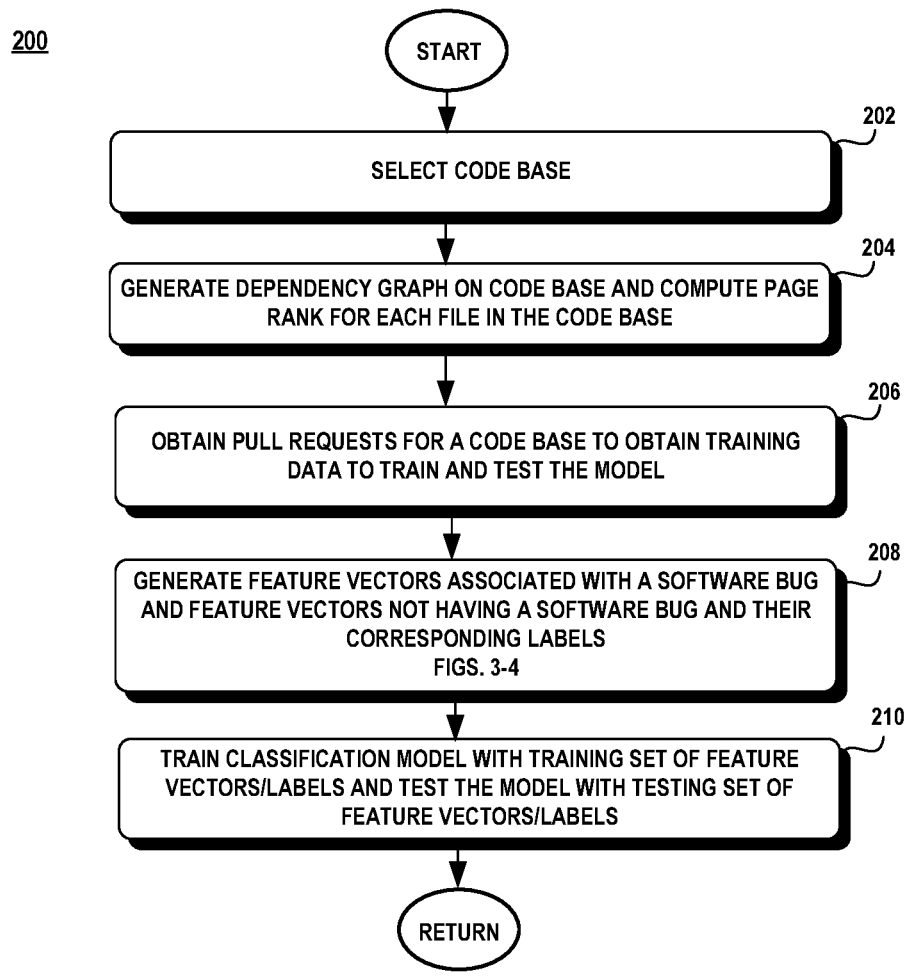
FIG. 2 is a flow diagram illustrating an exemplary method for training and testing the machine learning model.

Turning to FIG. 2, there is shown an exemplary method 200 for training the machine learning model. In one aspect, the machine learning model may be trained for a particular code base (block 202). A code base may be a collection of software files, artifacts, etc. that are used to build a software system, software component, project, etc. and which may be stored in a shared source code repository.

A dependency graph is constructed for the code base to reflect the dependency relationships between the different software files in the code base (block 204). In one aspect, the dependencies are based on method call relationships between files. A method call relationship is where a method is invoked in one file and the implementation for the invoked method exists in a different file. For example, if file A contains method foo that calls method bar and the implementation of method bar in file B, then file A is considered dependent on file B. A dependency graph representing the dependency relationships between the files in a code base is constructed using known methods such as control flow analysis, semantic level analysis, etc.

Figure 8:
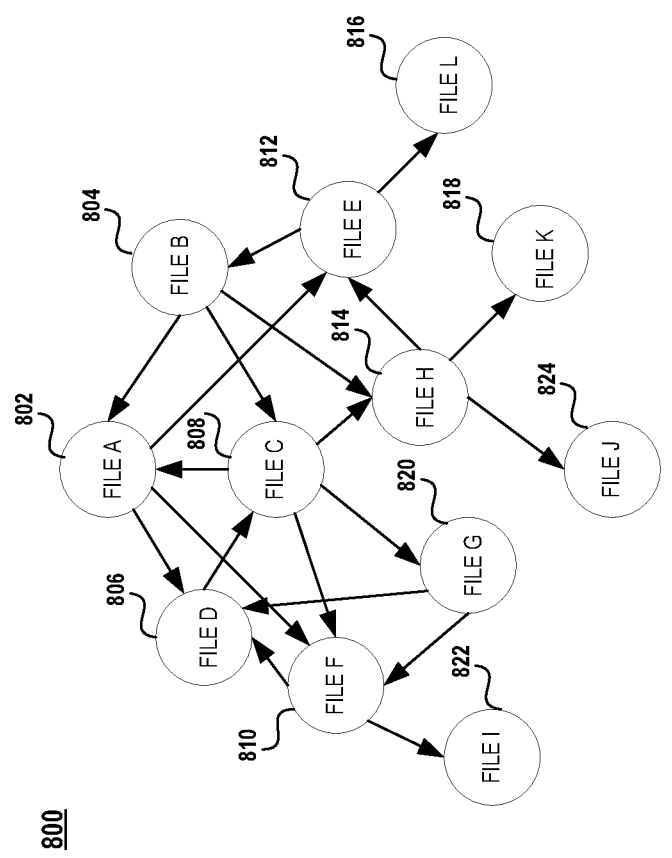
FIG. 8 is an exemplary diagram for detecting dependencies within a code base.

An exemplary dependency graph is shown in FIG. 8. The dependency graph includes nodes and edges that connect one node to another node. The nodes in the dependency graph 800 represent the files 802-824 of a code base and the edges represent dependencies. A forward edge going out of a first node and into a second node represents the first node's dependence on the file corresponding to the second node. A node's back edge, or incoming edge, represents the files that are dependent on it. For example, node 802 which represents File A has three forward edges and one back edge. The forward edges show that File A 802 has a dependency on File D 806, File E 812, and File F 810. File A 802 has a back edge from File B 804 and File C 808 which denotes that Files B and C are dependent on File A 802. The importance of a file is based on the number of files that depend on it directly and indirectly.

The dependency graph 800 is used to determine a page rank of a file. The page rank determines how important the file is based on the number of files that depend on it. A dependency is propagated iteratively from the back edges that directly connect to a node and from the back edges of all the nodes that propagate to those nodes. The page rank of a file maybe represented mathematically as follows:

$$PR(u) = \sum_{v \in B_u} \frac{PR(v)}{L(v)},$$

where PR is a page rank value for file u that is equal to the PR values of each dependent v contained in the set $B_u$, where $B_u$ is the set containing all the dependencies to node u, where $L(v)$ is the number of edges from node v, and $PR(u)$ is a probability within [0,1].

Pull requests that will be used to extract features to train and test the machine learning model are identified (block 206). A pull request indicates which files have been changed and a reason for the change. Pull requests that indicate changes were made to correct a software bug are selected as well as pull requests that indicate that no changes were made to correct a software bug. Features are extracted from the files associated with each pull request (block 208) and then used to train and test a classification-type machine learning model (block 210).

Figure 3:
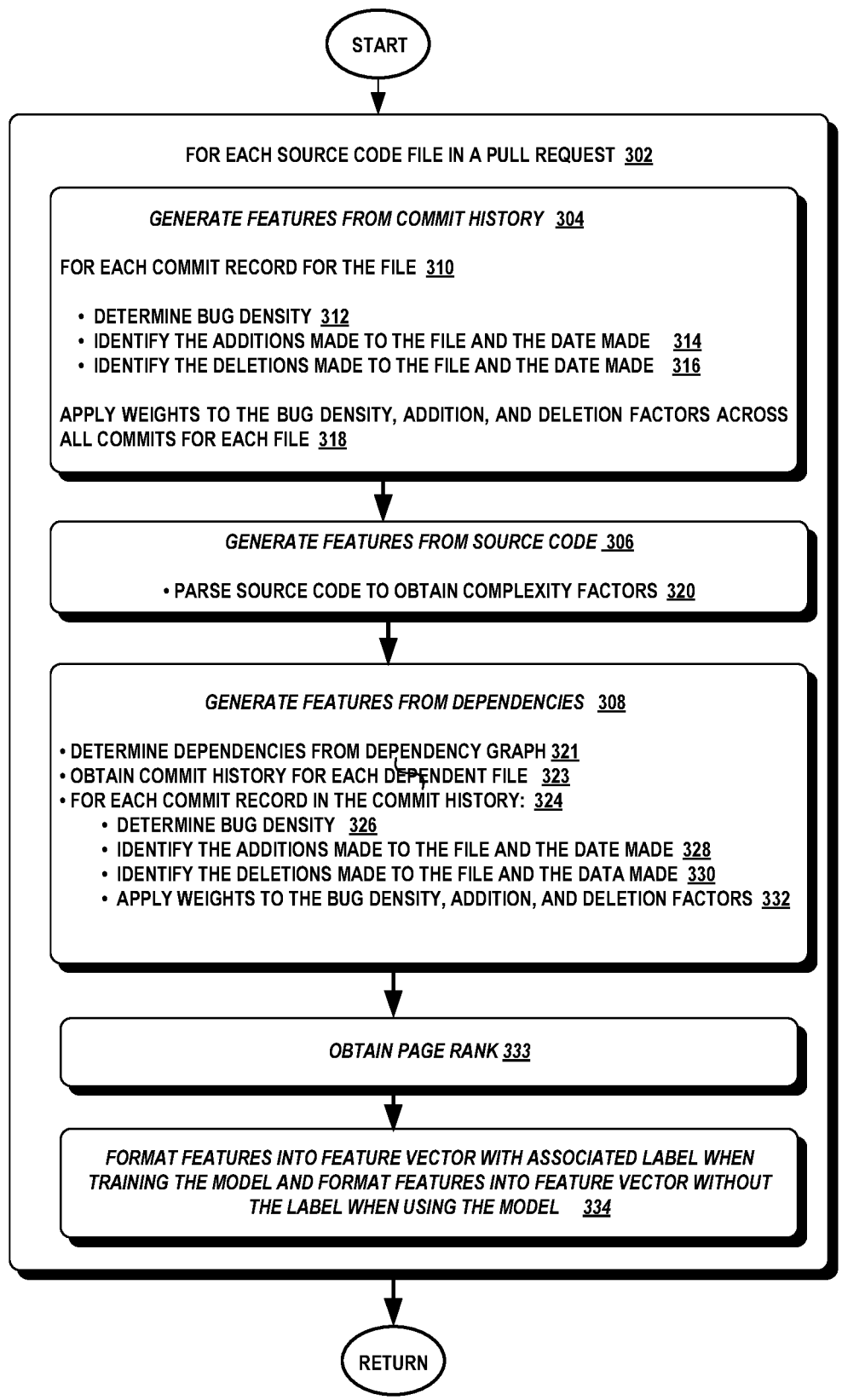
FIG. 3 is a flow diagram illustrating an exemplary method for generating the feature vectors to train and utilize the machine learning model.

FIG. 3 illustrates an exemplary method 300 for extracting features. For each file identified, either in a pull request or as the target source code file to analyze (block 302), features are extracted from each commit record in the file's commit history (block 304), from the source code of the file (block 306), and from the dependent code associated with the source code file (block 308). A pull request may include files having been changed to fix a software bug and the pull request may include files having been changed for other reasons than to fix a software bug. The machine learning model needs to be trained on features from both types of files, those having changes made to fix a software bug and those without changes made to correct a software bug.

The commit history is analyzed to obtain the bug density, addition factor and deletion factor for each file and its dependent code (block 310). A commit history lists each commit made in reverse chronological order along with other data, such as the author's name, email address, the commit date and a commit message that indicates the nature of the change. The nature of the change may identify a bug fix or other reasons why a change was made. In addition, a commit may list the modified files, the number of files that were changed, and how many lines were added and/or deleted. From this commit history, the bug density (block 312), the addition factor (block 314), and the deletion factor (block 316) for each file j and its dependent code can be determined as follows.

The bug density (BD) for file j at commit i can be computed as follows:

$$BD_i = \frac{\text{the number of software bugs tracked in commit } i}{\text{the number of commits for file } j}$$

In the case where the source code file has not had any changes made to correct a software bug, the bug density would be zero and there would not be any weights applied to the bug density having a zero value.

The addition factor for file j at commit i can be computed as follows:

$$ADD_i = \frac{\text{the number of lines of code added in commit } i}{\text{the number of lines of code in file } j}$$

The deletion factor for file j at commit i can be computed as follows:

$$DEL_i = \frac{\text{the number of lines of code deleted in commit } i}{\text{the number of lines of code in file } j}$$

The overall bug density is then computed as the sum of the bug densities for each commit in the commit history for a file. Likewise, the overall addition factor is computed as the sum of the addition factors for each commit in the commit history for the file. The overall deletion factor is computed as the sum of the deletion factors for each commit in the commit history for the file.

The overall bug density, addition factor and deletion factor are weighted based on when the corresponding changes were made (block 318). The factors associated with recent commits are weighted higher than the factors associated with earlier commits. The time is determined from the date of the commit record. By weighting these factors with respect to time, the more recent changes are given a higher weight or importance than older changes.

Figure 4:
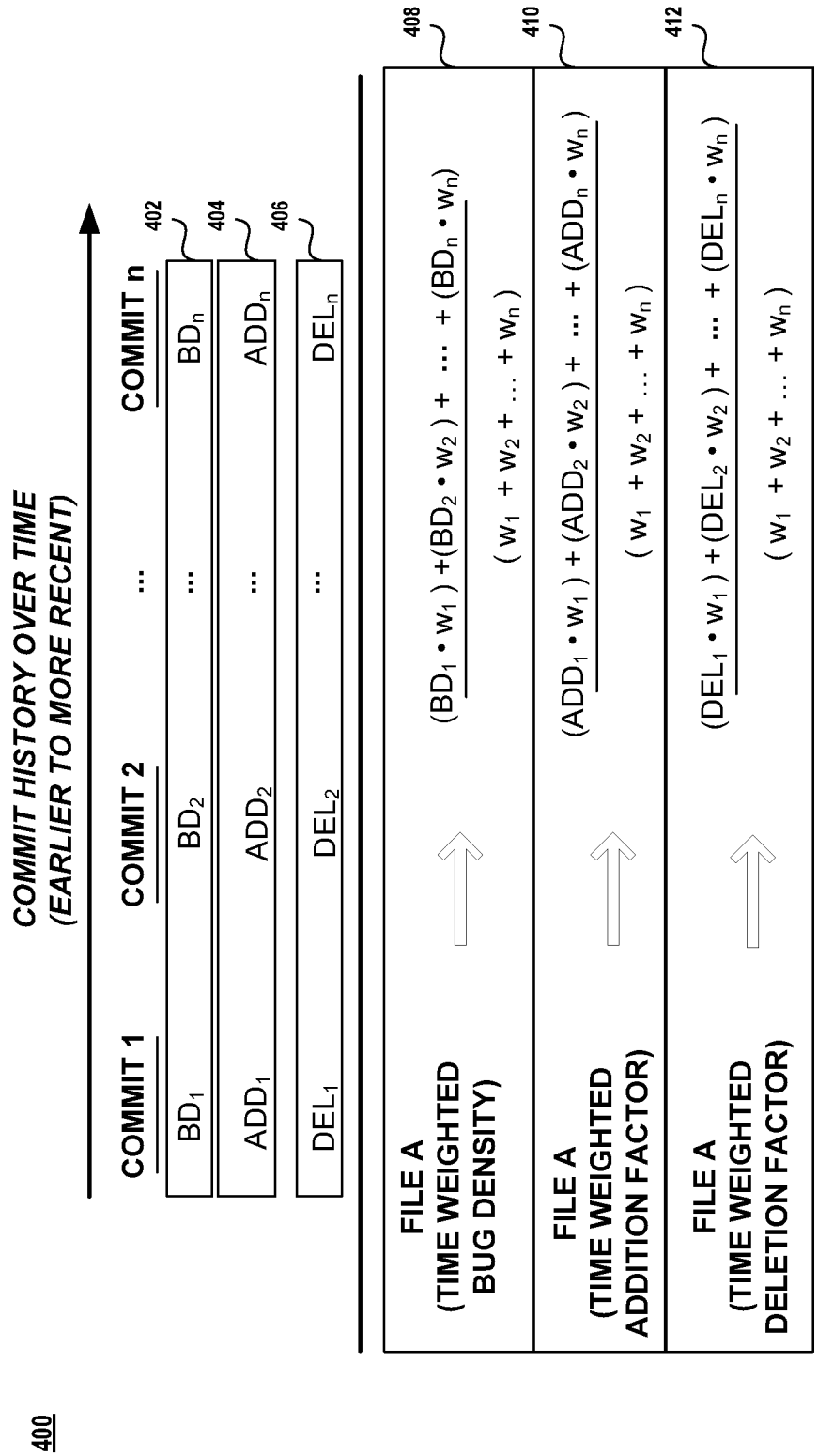
FIG. 4 is a schematic diagram illustrating an exemplary method for time-weighing the bug density, addition factor and deletion factor.

FIG. 4 illustrates an example of the time weighting for a source code file having had changes made to correct a bug fix. In this example, the time weighting is applied to one particular file, File A, in a pull request whose commit history includes n commits that have been recorded over a particular time period. The commits are ordered in increasing chronological order with commit 1 being the oldest and commit n being the latest and most current commit record As shown in FIG. 4, the bug density for File A is shown for each commit in block 402. The bug density for commit 1 is $BD_1$, the bug density for commit 2 is $BD_2$, and the bug density for commit n is $BD_n$. The overall bug density for File A is computed as shown in block 408 as $\dfrac{\sum_{i=1}^{n} BD_i * w_i}{\sum_{i=1}^{n} w_i} = \dfrac{(BD1 \cdot w_1) + (BD2 \cdot w_2) + \ldots (BDn \cdot w_n)}{w_1 + w_2 + \ldots + w_n},$ where $$w_i = \dfrac{1}{1 + e^{-12\tilde{n}+\lambda}},$$

$t_i$ is a normalized value between [0,1], with "0" representing older values and "1" representing later values, where $\lambda$ ranges between 6-12, where $\lambda$ represents the strength of the decay (i.e., how fast $w_i$ will become close to 0). The larger the value of $\lambda$, the stronger the decay. The value of $\lambda$ is decided during training as the value that reaches the highest precision.

The addition factor for File A in each commit is shown in block 404. The addition (ADD) factor for commit 1 is $ADD_1$, the addition factor for commit 2 is $ADD_2$ and the addition factor for commit n is $ADD_n$. The overall weighted addition factor for File A is computed as shown in block 410 which is as follows:

$$\dfrac{\sum_{i=1}^{n} ADD_i * w_i}{\sum_{i=1}^{n} w_i} = \dfrac{(ADD1 \cdot w_1) + (ADD2 \cdot w_2) + \ldots (ADDn \cdot w_n)}{w_1 + w_2 + \ldots + w_n},$$

where the weights $w_i$ are calculated as described above.

The deletion factor for File A for each commit is shown in block 406. The deletion (DEL) factor for commit 1 is $DEL_1$, the deletion factor for commit 2 is $DEL_2$ and the deletion factor for commit n is $DEL_n$. The overall weighted deletion factor for File A is computed as shown in block 412 which is as follows:

$$\dfrac{\sum_{i=1}^{n} DEL_i * w_i}{\sum_{i=1}^{n} w_i} = \dfrac{(DEL1 \cdot w_1) + (DEL2 \cdot w_2) + \ldots (DELn \cdot w_n)}{w_1 + w_2 + \ldots + w_n},$$

where the weights $w_i$ are calculated as described above.

Turning back to FIG. 3, features are extracted from each source code file in the pull request to represent the complexity of the source code (block 306). These complexity features are based on the syntax of the programming language of the source code. The syntax is defined by the grammar of the programming language. In one aspect, the complexity features may include one or more of the following: (1) the number of classes; (2) the number of fields; (3) the number of properties; (4) the number of methods; (5) the number of indexers; (6) the number of events; (7) the number of interfaces; (8) the number of catches; (9) the number of operations; (10) the number of variables; (11) the number of structs; (12) the number of statements; (13) the number of while statements; (14) the number of for each statements; (15) the number of break statements; (16) the number of continue statements; (17) the number of if statements; (18) the number of switch statements; and (19) the number of try statements. These features measure the complexity of a source code file and the machine learning engine automatically chooses those complexity features that are more important for classification.

The source code file is parsed to build a syntactic representation of the source code. The syntactic representation of the source code may be a parse tree, abstract syntax tree or the like. From the syntactic representation of the source code, the complexity features are extracted through application programming interface (API) calls. The complexity features are then used to format a feature vector representing the source code file.

Next, features are generated for the dependencies found in the source code file from a pull request (block 308). The dependency graph is used to determine the dependencies of a file (block 321). For each dependent source code file (block 322), the commit history of the dependent source code file is obtained in order to analyze each of its commits. For each commit in the commit history of the dependent source code (block 324), the bug density (block 326), the addition factor (block 328), and the deletion factor (block 330) are calculated and weighted (332) as described above with respect to FIG. 3 (blocks 310-318) and FIG. 4.

The page rank associated with the file is obtained (block 333). The page rank can be computed previously as noted above or when the features are being extracted for the file. The features of each file in the pull request are then formatted into a feature vector with a label classifying the feature vector as either having a software bug or not having a software bug (block 334). This label comes from the comments in the commit record which indicate the reason for a change. The label is included in a feature vector when the feature vector is used to train the machine learning model.

Turning to FIG. 9A, there is shown an exemplary feature vector that is used to train the machine learning model. The feature vector 900 for a file includes the time-weighted bug density 904, the time-weighted addition factor 906, the time-weighted deletion factor 908, the complexity factors 910, the time-weighted bug density for the dependent files 912, the time-weighted addition factor for the dependent files 914, the time-weighted deletion factor for the dependent files 916, the page rank 918, and the label 920.

The time-weighted bug density for the dependent files is computed as the sum of all the time-weighted bug density of each of the dependent files. Likewise, the time-weighted addition factor for the dependent files is the sum of all the time-weighted addition factors for all the dependent files and the time-weighted deletion factor for the dependent file is the sum of all the time-weighted deletion factors for all the dependent files.

FIG. 9B illustrates an exemplary feature vector 902 that is input to the machine learning model to compute a risk score for a file. The feature vector 902 includes the time-weighted bug density 924, the time-weighted addition factor 926, the time-weighted deletion factor 928, the complexity factors 930, the time-weighted bug density for the dependent files 932, the time-weighted addition factor for the dependent files 934, the time-weighted deletion factor for the dependent files 936, and a page rank 938.

Figure 5:
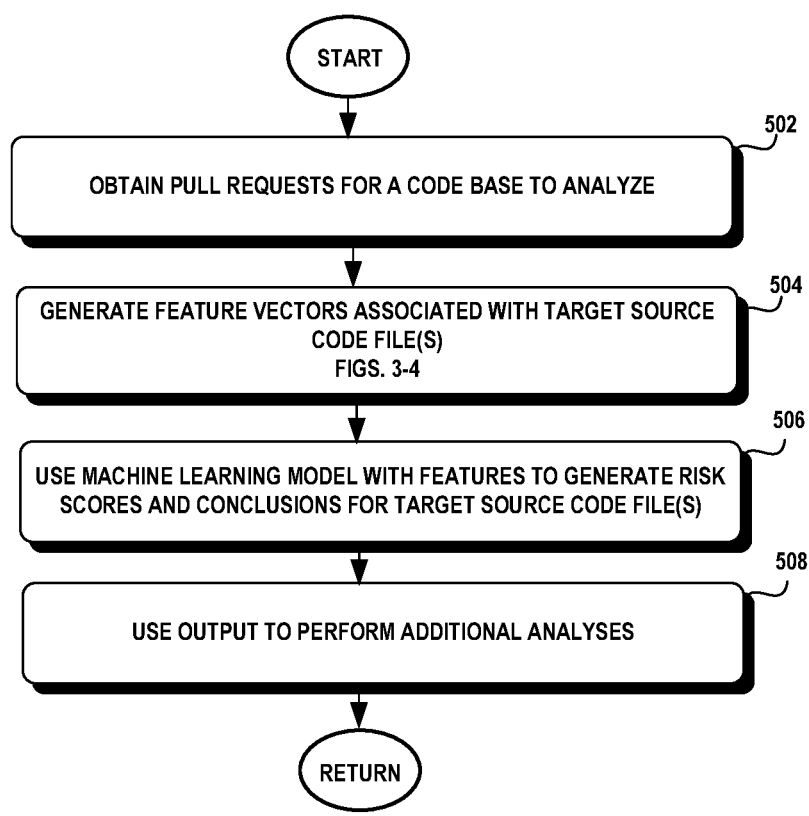
FIG. 5 is a flow diagram illustrating an exemplary method for utilizing the machine learning model to generate risk scores and conclusions for one or more target source code files.

FIG. 5 illustrates an exemplary method describing how the machine learning model is used after it has been trained and tested. A target code base is selected from which one or more files are chosen for analysis. A machine learning model is selected that has been trained on the target code base. The data mining engine 110 obtains pull requests for the files selected for analysis (block 502). The commit histories for the selected files and the source code files are obtained and transmitted to the feature extraction engine 132 (block 504).

The feature extraction engine obtains the features from the source code files in the pull request and their respective dependent code as noted above to generate feature vectors containing the weighted bug density features, weighted addition features, weighted deletion features from the source code files and their respective dependent code, the page rank and the complexity features (block 506). The feature vectors are used by the machine learning model to predict the likelihood that each file represented by the feature vectors is likely to have a software bug in the future (block 506). The machine learning model generates a risk score for each file represented by a feature vector (block 506). The risk score is a value normalized within the range [0,1] where '0' represents no risk and '1' represents the highest risk. In addition, a rationale is provided that explains the risk score (block 506).

The output from the machine learning model may be used to perform additional analyzes (block 508). For example, those files having a high risk score may be further analyzed and tested to discover latent software bugs. Those files having a high risk score may be sent to one or more reviewers for further analysis.

Figure 6:
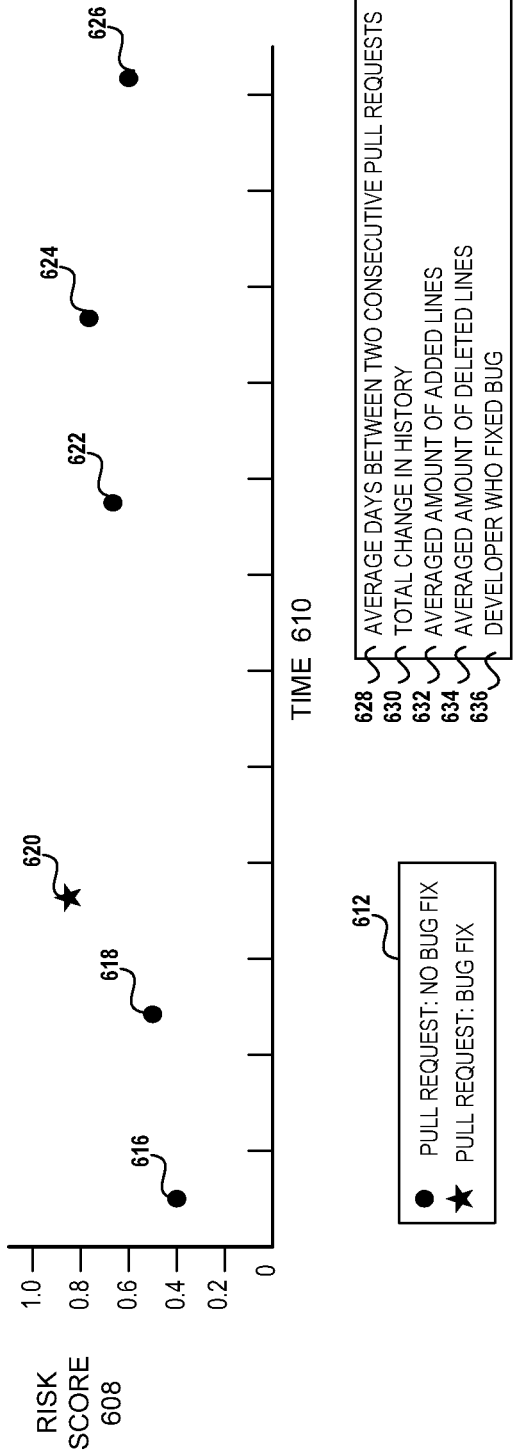
FIGS. 6A-6B are exemplary displays illustrating the output of the machine learning model.

FIGS. 6A-6B illustrate exemplary output that can be generated from the results of the machine learning model. FIG. 6A shows a display 600 having a list of files 602 and a conclusion statement 604 for the file "SharedDataSource.cs." The conclusion statement 604 indicates a rationale for the file's risk score detailing why the file is likely to contain a software bug in the future. The conclusion statement states "This file's changes are spaced far apart, which may indicate complex interdependencies in your change or in a change with multiple intents. The number of IF statements is high which may be an indicator of complex control logic." A developer having reviewed the risk score and the conclusion statement may take actions to alleviate the potential for a future software bug.

FIG. 6B shows another output in the form of a graph 606 which plots the overall risk score for the files in a pull request over a time period. The x-axis of the graph plots different time periods in increasing chronological order 610 and the y-axis of the graph plots the risk score 608. The legend 612 indicates that the pull requests that have not had any changes made due to a bug fix 616, 618, 622, 624, 626 and the pull requests having had changes made for a bug fix 620. Box 614 shows data pertaining to the pull requests such as the average number of days between two consecutive pull requests 628, the total number of changes mad in the commit history 630, the average amount of added lines made in the pull requests 632, the average amount of deleted lines made in the pull requests 634 and the developer who made a change to fix a software bug 636. A developer may utilize this graph and data to perform additional reviews of the file.

Technical Effect

Aspects of the subject matter disclosed herein pertain to the technical problem of predicting the likelihood that a software program may contain a software bug in the future. The technical features associated with addressing this problem is a machine learning technique that makes the prediction based those attributes having the most impact on causing a software bug. These attributes are based on the changes made to the source code file and its dependent code over time, the page rank of a file, and the complexity of the programming elements used in the source code. The changes made to the source code file and its dependent code over time are weighted to give more importance to those changes having been performed recently over those changes occurring in the past. The complexity of the source code is considered from counts of particular program elements within the code. In this manner, the model is able to more accurately predict the likelihood of a source code file having risky source code.

Exemplary Operating Environment

Figure 7:
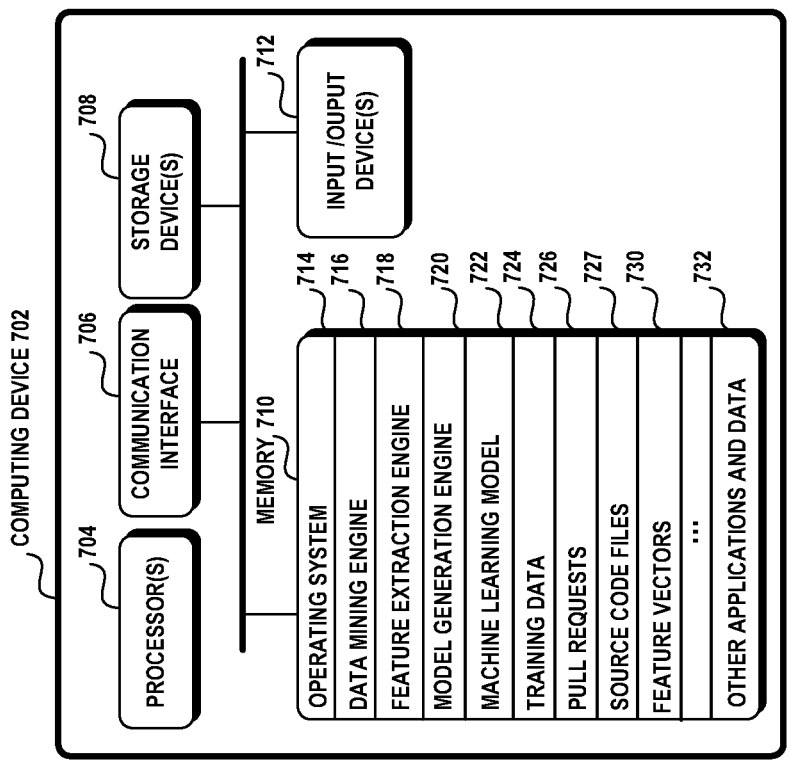
FIG. 7 is a block diagram illustrating an exemplary operating environment.

Attention now turns to a discussion of an exemplary operating embodiment. FIG. 7 illustrates a first exemplary operating environment 700 that includes at least one computing machine 702. The computing machine 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

A computing machine 702 may include one or more processors 704, a communication interface 706, one or more storage devices 708, one or more input and output devices 712, and a memory 810. A processor 704 may be any commercially available or customized processor and may include dual microprocessors and multi-processor architectures. The communication interface 706 facilitates wired or wireless communications between the computing device 702 and other devices. A storage device 708 may be a computer-readable medium that does not contain propagating signals, such as modulated data signals transmitted through a carrier wave. Examples of a storage device 708 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 708 in the computing device 702. The input/output devices 712 may include a keyboard, mouse, pen, voice input device, touch input device, display, speakers, printers, etc., and any combination thereof.

The memory 710 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 710 may also include one or more external storage devices or remotely located storage devices that do not pertain to propagated signals, such as modulated data signals transmitted through a carrier wave.

The memory 710 may contain instructions, components, and data. A component is a software program that performs a specific function and is otherwise known as a module, program, engine, and/or application. The memory 710 may include an operating system 714, a data mining engine 716, a feature extraction engine 718, a model generation engine 720, a machine learning model 722, training data 724, pull requests 726, source code files 728, feature vectors 730 and other applications and data 732.

CONCLUSION

A system is disclosed that contains one or more processors, a memory and one or more modules. The one or more modules are configured to be executed by the one or more processors to perform actions that obtain historical data of changes made to at least one source code file, extract change features from the historical data, the change features including a bug density, an addition factor and a deletion factor, apply a time weight to each of the change features, the time weight based on a time changes were made to the at least one source code file, extract complexity features from the at least one source code file, the complexity features including counts of a plurality of programming elements in the at least one source code file, associate a label with each of a plurality of feature vectors, a feature vector including the weighted change features and the complexity features, and train a classifier machine learning model on the plurality of feature vectors and labels to predict a likelihood that a source code file will have a software bug.

In addition, the system generates a page rank for the at least one source code file, the page rank based on method call dependencies of the at least one source code file, extracts change features on dependent code of the at least one source code file and utilizes the extracted change features of the dependent code to train the classifier machine learning model. The classifier machine learning model can be a gradient boost classification model, a discrete tree classifier, random tree classifier, neural network, support vector machine, or naïve Bayes classifier. The at least one source code file includes one or more source code files having been changed to fix a software bug and one or more source code files not having been changed to fix a software bug.

A method is disclosed that performs action including obtaining a commit history of at least one source code file, the commit history identifying one or more changes made to the at least one source code file; generating one or more change features for each of the one or more changed versions, the one or more change features including a weighted bug density, a weighted addition factor and a weighted deletion factor; generating one or more complexity features for the at least one source code file, the one or more complexity features based on programming elements in the at least one source code file; generating one or more change features for each dependent code associated with the at least one source code file; creating a plurality of feature vectors including the one or more change features for each of the one or more changed versions, the one or more complexity features, and the one or more change features for each dependent code; and predicting a probability that the at least one source code file has a future software bug using the plurality of feature vectors.

The probability is determined from a classifier machine learning model and the classifier machine learning model is trained on change features from a plurality of source code files and associated dependent code, and a plurality of complexity features corresponding to the plurality of source code files. The weighted addition factor and the weighted deletion factor are weighted based on a time changes were made to the at least one source code file. weighted bug density is weighted based on a time changes were made to correct a software bug. In addition, the method generates a page rank for the at least one source code file based on other source code files containing dependent source code used in the at least one source code file.

A device is disclosed that wherein the at least one processor performs actions that: train a classifier model with a plurality of feature vectors, a feature vector representing a source code file of a code base, the feature vector including a time-weighted bug density associated with the source code file, a time-weighted addition factor associated with the source code file, a time-weighted deletion factor associated with the source code file, a page rank of the source code file, a time-weighted bug density associated with dependent code of the source code file, a time-weighted addition factor associated with dependent code of the source code file, and a time-weighted deletion factor associated with dependent code of the source code file; and use the classifier model to generate a risk score indicating a probability that a select source code file is likely to contain a future software bug.

The device outputs a conclusion supporting the risk score. The classifier model is a gradient boost classifier. The different program elements include one or more of the following: (1) the number of classes; (2) the number of fields; (3) the number of properties; (4) the number of methods; (5) the number of indexers; (6) the number of events; (7) the number of interfaces; (8) the number of catches; (9) the number of operations; (10) the number of variables; (11) the number of structs; (12) the number of statements; (13) the number of while statements; (14) the number of for each statements; (15) the number of break statements; (16) the number of continue statements; (17) the number of if statements; (18) the number of switch statements; or (19) the number of try statements. The page rank is based on method call dependencies of the source code file computed iteratively over the code base.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It should be noted that two versions of a program are being compared. The versions may be denoted as beta version, previous version, currently released version, etc. These names are not intended to limit or constrain the subject matter to a particular type of versions.

What is claimed:

1. A system comprising:
   one or more processors and a memory;
   one or more modules, wherein the one or more modules are configured to be executed by the one or more processors to perform actions that:
   compute a bug density for a source code file from historical data of the source code file, wherein the historical data represents changes made to the source code file over a time span to fix at least one software bug;
   generate at least one change factor that represents a magnitude of the changes made to the source code file to fix the at least one software bug;
   apply a time weight to the bug density and to the at least one change factor, the time weight based on a time when the changes were made to the source code file; and
   utilize the bug density and the at least one change factor to train a classifier machine learning model to determine a probability of the source code file having a software bug at a future time.

2. The system of claim 1, wherein application of the time weight gives a higher weight to recent changes made to the source code file.

3. The system of claim 1, wherein the at least one change factor includes an addition factor and a deletion factor.

4. The system of claim 1, wherein the one or more processors perform additional actions that:
   extract one or more complexity features from the source code file; and
   train the classifier machine learning model with an amount of each of the one or more complexity features.

5. The system of claim 1, wherein the one or more processors perform additional actions that:
   obtain one or more dependent files of the source code file;
   generate a time-weighted bug density for each of the one or more dependent files; and
   utilize the time-weighted bug density of each of the one or more dependent files to train the classifier machine learning model.

6. The system of claim 5, wherein the one or more processors perform additional actions that:
   generate a time-weighted addition factor and a time-weighted deletion factor for each of the one or more dependent files; and
   utilize the time-weighted addition factors and the time-weighted deletion factors of each of the one or more dependent files to train the classifier machine learning model.

7. The system of claim 1, wherein the one or more processors perform additional actions that:
   generate a page rank for the source code file, the page rank based on method call dependencies of the source code file; and
   utilize the page rank to train the classifier machine learning model.

8. The system of claim 1, wherein the classifier machine learning model is a gradient boost classification model.

9. The system of claim 1, wherein the classifier machine learning model is one of a discrete tree classifier, random tree classifier, neural network, support vector machine, or naïve Bayes classifier.

10. A method, comprising:
    obtaining a source code file to predict a likelihood of having a software bug at a future time;
    extracting historical change data for the source code file;
    generating a time-weighted bug density, a time-weighted addition factor, and a time-weighted deletion factor from the historical change data; and
    utilizing the time-weighted bug density, the time-weighted addition factor, and the time-weighted deletion factor as input into a machine learning model to obtain a risk score indicating a probability of the source code file containing a software bug at a future time.

11. The method of claim 10, further comprising:
    extracting one or more complexity features from the source code file; and
    inputting an amount of each of the one or more complexity features into the classifier machine learning model to obtain the risk score.

12. The method of claim 10, further comprising:
    generating a page rank for the source code file, the page rank based on method call dependencies of the source code file; and
    inputting the page rank into the machine learning model to generate the risk score.

13. The method of claim 10, wherein the time-weighted addition factor and the time-weighted deletion factor weigh recent changes more than past changes.

14. The method of claim 10, further comprising:
    determining one or more dependent files of the source code file;
    generating a time-weighted bug density for each of the one or more dependent files; and
    incorporating the time-weighted bug density of each of the one or more dependent files into the machine learning model to obtain the risk score.

15. The method of claim 10, further comprising:
    finding one or more dependent files of the source code file;
    generating a time-weighted addition factor and a time-weighted deletion factor for each of the one or more dependent files; and
    inputting each of the time-weighted addition factors and each of the time-weighted deletion factors into the machine learning model to obtain the risk score.

16. A device, comprising:
    a memory coupled to a processor;
    wherein the at least one processor is configured to:
    determine whether a source code file is likely to have a software bug in a future time using a classifier machine learning model that uses features extracted from changes made to the source code file over time, wherein the features extracted from changes made to the source code file over time include a time-weighted bug density, a time-weighted addition factor and a time-weighted deletion factor.

17. The device of claim 16, wherein the classifier machine learning model uses a page rank associated with the source code file to determine whether the source code file is likely to have a software bug.

18. The device of claim 16, wherein the classifier machine learning model uses a set of complexity factors to determine whether the source code file is likely to have a software bug.

19. The device of claim 16, wherein the classifier machine learning model uses features extracted from changes made to one or more dependent files associated with the source code file, the features extracted from changes made to the one or more dependent files include a time-weighted bug density, a time-weighted addition factor, and a time-weighted deleted factor for each of the one or more dependent files.

20. The device of claim 16, wherein the classifier machine learning model is one of a gradient boost classifier, discrete tree classifier, random tree classifier, neural network, support vector machine, or naïve Bayes classifier.

\* \* \* \* \*